July 25, 1961 K. B. MAXWELL 2,993,430
COFFEE BREWER
Filed Nov. 18, 1959 4 Sheets-Sheet 2
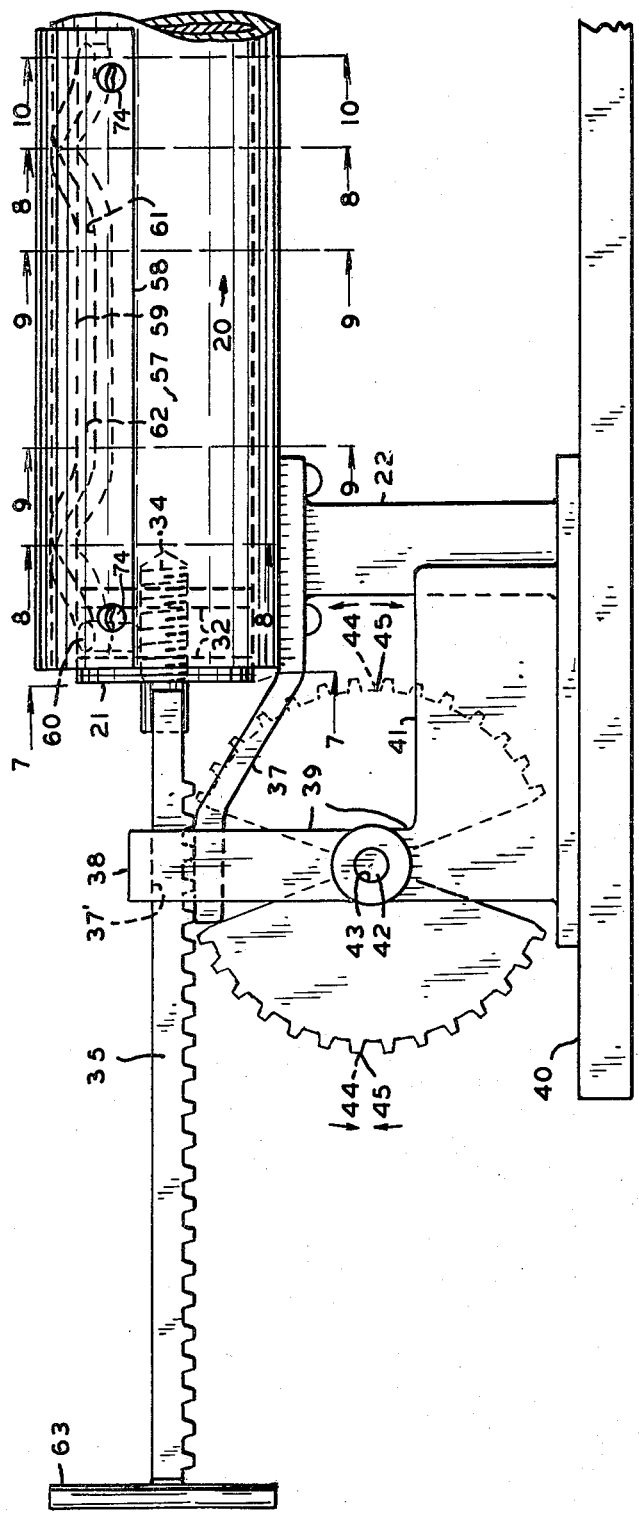
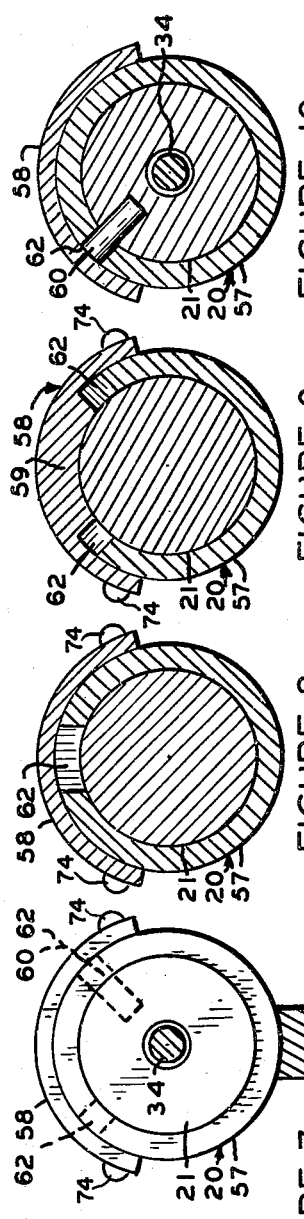
INVENTOR.
KEATON BRUCE MAXWELL
BY
ATTORNEY INVENTOR.
KEATON BRUCE MAXWELL
BY Marvin C. Davis
ATTORNEY July 25, 1961 K. B. MAXWELL 2,993,430
COFFEE BREWER
Filed Nov. 18, 1959 4 Sheets-Sheet 4
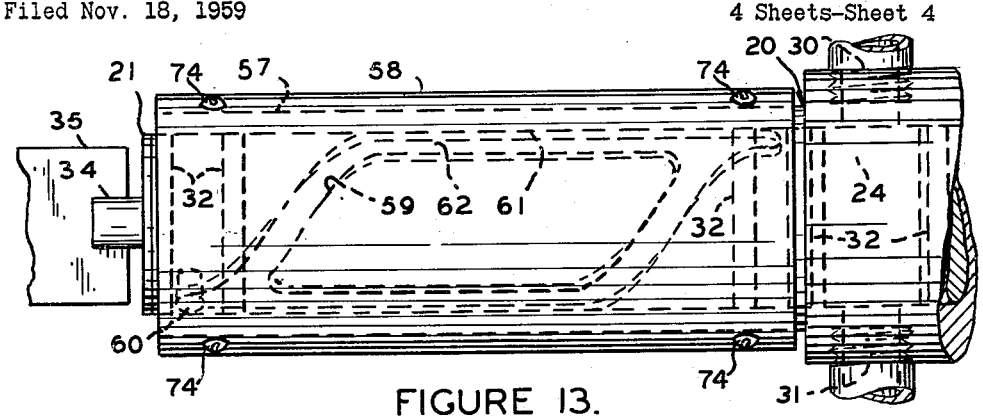
FIGURE 13.
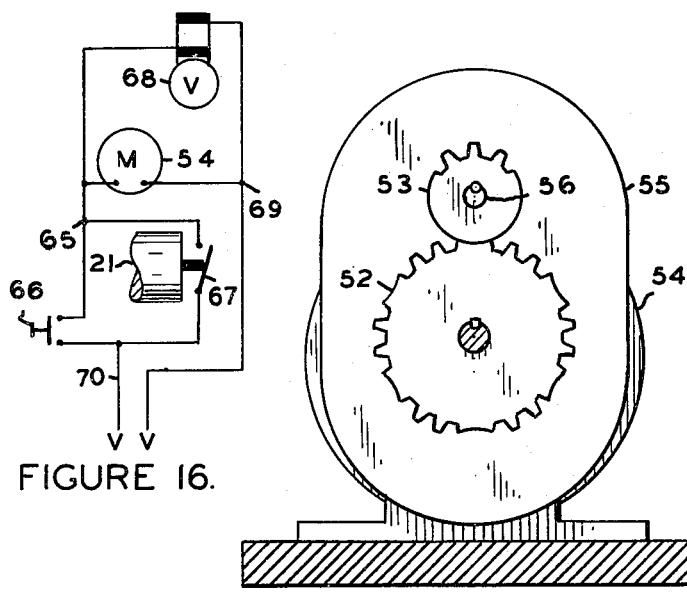
FIGURE 16.
FIGURE 14.
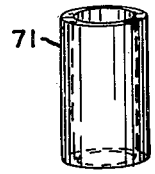
FIGURE 17.
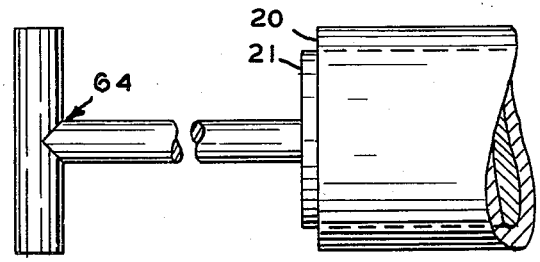
FIGURE 15.
INVENTOR.
KEATON BRUCE MAXWELL
BY
Marvin B. Davis
ATTORNEY

United States Patent Office 2,993,430
Patented July 25, 1961

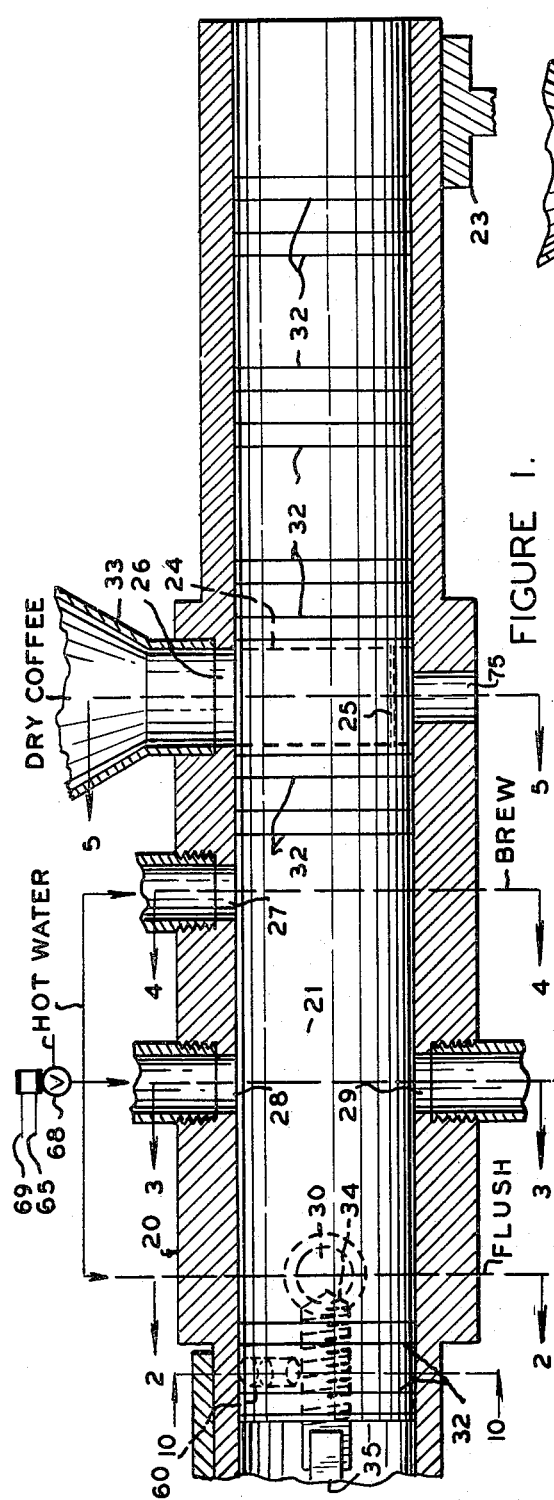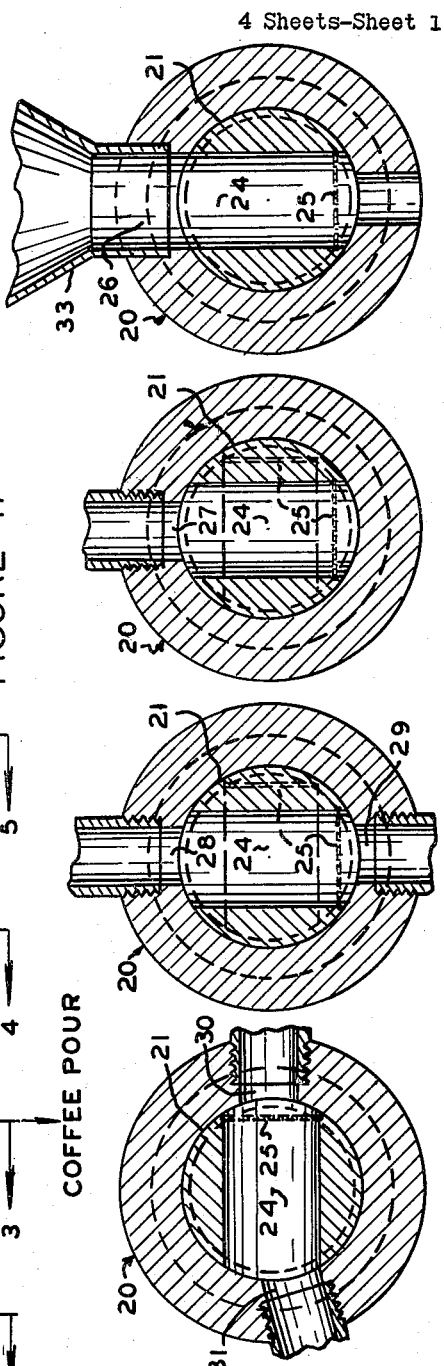

2,993,430
COFFEE BREWER
Keaton Bruce Maxwell, 722 Ward Parkway,
Kansas City 12, Mo.
Filed Nov. 18, 1959, Ser. No. 853,973
4 Claims. (Cl. 99—289)

This invention relates to an improved economical coffee brewer for automatically and uniformly brewing and dispensing one measure of freshly brewed coffee at a time and repeat in rapid succession as desired.

Heretofore coffee brewers for automatically brewing and dispensing one measure of coffee at a time have been very complicated and expensive due to the structural and intricate parts thereto. Vending machines and cabinets are old. Instant coffee is objectional to many people. Most people prefer to taste and drink well brewed and freshly made coffee.

An object of my invention for brewing coffee is in the provision of an actuated reciprocating piston having a measure hole located transversely therethrough and slidable in a bored cylinder therefor to intermittently register with consecutive ports in the cylinder therefor for receiving and dispensing measured supplies of materials for brewing fresh coffee in a single cycle of reciprocation, and return the piston so as to register the measure hole therein with the starting port thereof.

Another object of my invention is to automatically turn the piston with a cam actuator on the longitudinal axis thereof relative to the position of the cylinder therefor to register the measure hole in the piston with ports for reverse flushing the measure hole relative to a screen therein adapted to withhold coffee grounds during the pouring of coffee in the piston after the fresh coffee has been brewed and poured.

Another object of my invention is to automatically turn the piston with a cam actuator on the longitudinal axis thereof relative to the position of the cylinder therefor on the return cycle thereof mentioned heretofore to close the mentioned ports of supply materials.

My invention will be more fully understood by reference to the accompanying drawings, this specification and the claims appended.

In the drawings:

FIGURE 1 is a view illustrating a longitudinal elevation of the piston with fragmentary portions of the cylinder, ports and hopper for dry coffee.

FIGURE 2 is a view illustrating a section taken on lines 2—2 of FIGURE 1 showing the reverse flush ports, the transverse measure hole located in the piston, and the screen secured in one end portion of the measure hole adapted for withholding the coffee grounds after the brewed coffee has been poured.

FIGURE 3 is a view illustrating a section taken on lines 3—3 of FIGURE 1, showing the ports adapted for adding hot water to the coffee brew and pouring the brewed coffee.

FIGURE 4 is a view illustrating a section taken on lines 4—4 of FIGURE 1 showing the port for adding hot water to the ground coffee for brewing the fresh coffee.

FIGURE 5 is a view illustrating a section taken on lines 5—5 of FIGURE 1 showing the starting port with a hopper positioned for filling the measure hole with fresh ground coffee.

FIGURE 6 is a view illustrating the longitudinal elevation of the forward portion of the bored cylinder, the cam actuators, the actuator mechanism rack and intermittent gears with mountings therefor. Segmental gear 45 is shown in full lines in readiness to drive the rack 35 connected to piston 21 toward the opposite end of the cylinder and then rests in the half rotated position illustrated with dash lines. Segmental gear 44 is illustrated behind segmental gear 45 in both full lines and dashed lines because of opposite rotations thereof, and is used to return the rack to the position illustrated.

FIGURE 7 is a view illustrating a section taken on lines 7—7 of FIGURE 6, showing the forward end of the bored cylinder, piston and cam actuators, and a bolt in section pivoted to the cylinder for actuation by the rack of the actuator mechanism. A support for the forward end portion of the cylinder is shown in fragmentary section.

FIGURE 8 is a view illustrating a section taken on lines 8—8 of FIGURE 6, showing the piston in the bored cylinder, cam actuator plate and groove therefor in the cylinder.

FIGURE 9 is a view illustrating a section taken on lines 9—9 of FIGURE 6 showing the piston in the bored cylinder, cam actuator plate, and grooves therefor.

FIGURE 10 is a view illustrating a section taken on lines 10—10 of FIGURE 6, showing the piston moved to the rear starting position in the cylinder with the actuating cam pin located therein and positioned in the starting position of the cam groove of the cylinder.

Figure 11:
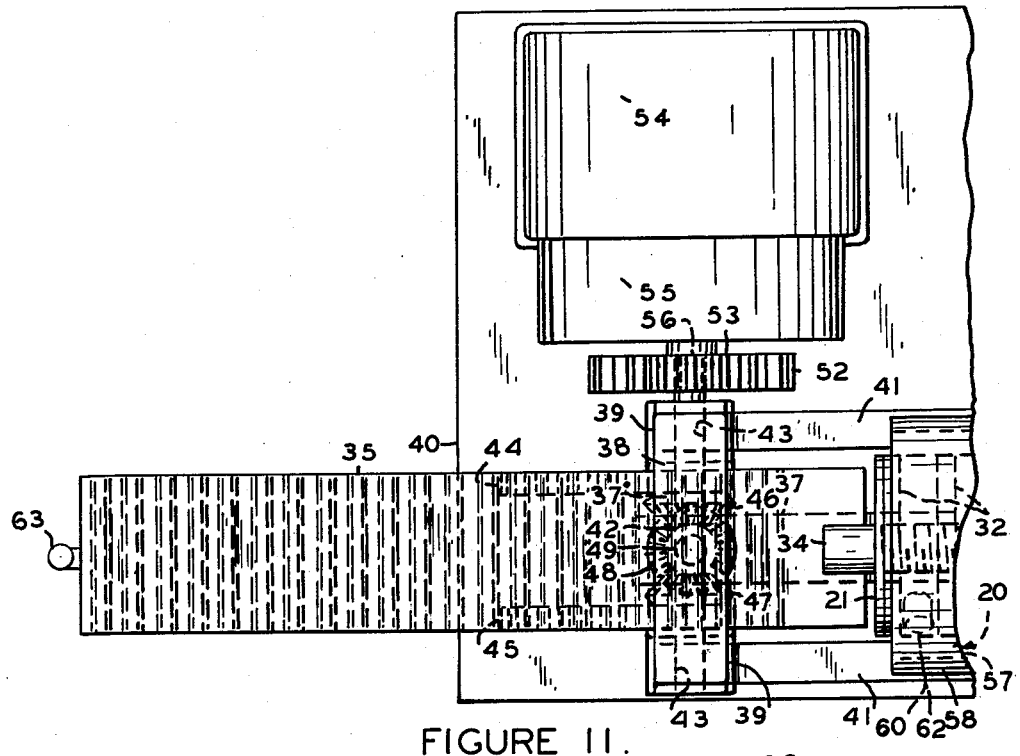

FIGURE 11 is a view illustrating a plan of the actuator mechanism, the cylinder, piston and base being shown in fragmentary form.

Figure 12:
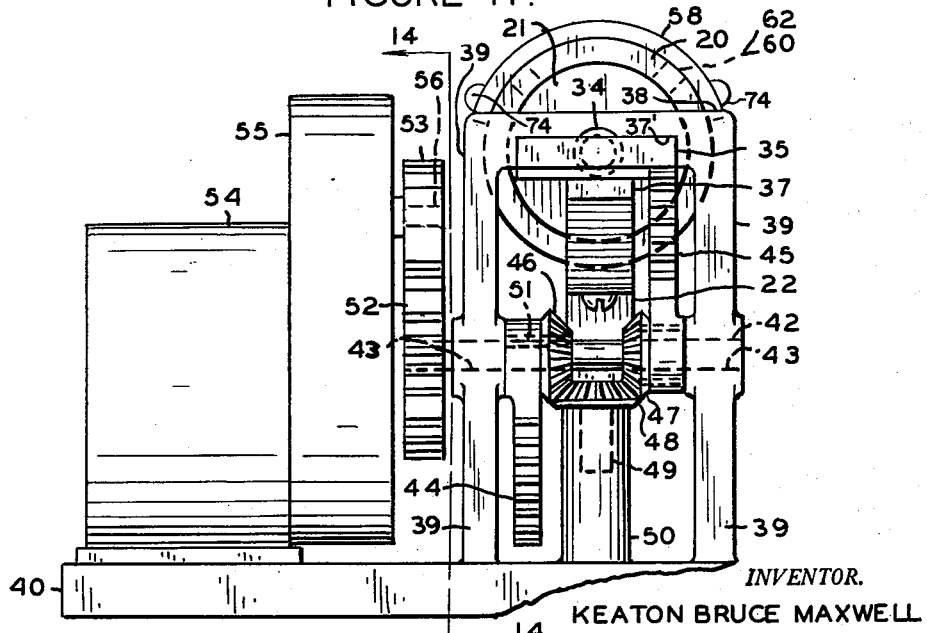

FIGURE 12 is a view illustrating the forward end elevation of the coffee brewer, a portion of the base being broken away for illustration.

FIGURE 13 is a view illustrating the plan of the cam actuator plate, the cam grooves being shown in dash lines and the piston positioned forwardly in the cylinder, the piston and cylinder being shown in fragmentary form.

FIGURE 14 is a view illustrating a section taken on lines 14—14 of FIGURE 12, showing the reduction motor, intermittent gears, and a fragment of the mounting base.

FIGURE 15 is a modified view illustrating a T shape handle means adapted for manual actuation of the cylinder, the cylinder and piston are shown in fragmentary form.

FIGURE 16 is a diagrammatic view of an electrical system for operation of the coffee brewer.

FIGURE 17 illustrates a liner 71 that may be inserted in the transverse measure hole 24 and is adapted to reduce the capacity of the measure thereof when desired.

The cylinder 20 is elongated, bored and ground from end to end for the fitted piston 21 to slide therein. The cylinder rests on supports 22 and 23. The cylinder 20 is provided with a transverse hole 24 therethrough adapted for measuring and receiving the materials for brewing coffee. A screen 25 is located near one end of the transverse hole 24 and is adapted to withhold grounds from the coffee brewed therein.

The cylinder 20 is provided with multiple ports consecutively spaced as follows: ground coffee intake port 26, hot water intake port 27 adapted for the brewing position, hot water intake port 28 adapted for adding hot water to the freshly brewed coffee and dispensing through the opposed discharge port 29, and reverse flushing intake port 30 with opposed discharge port 31. A hole 75 is provided below port 26 for drainage of any water that may leak from the piston between the rings thereof.

The piston 21 is provided with a plurality of rings 32 preferably made of plastic material to prevent escaping water from one intake port to another as the piston 21 is reciprocated in the cylinder 20.

The dry coffee hopper 33 is positioned to discharge freshly ground coffee into the intake port 26.

The piston 21 is provided with the pivot screw 34 having a portion thereof loosely threaded concentrically in the forward end thereof. The opposite end portion of the pivot screw 36 is secured to one end of toothed rack 35. The toothed rack 35 is held in a normal sliding position with a support bar 37 secured to the support 22.

The toothed rack 35 is fitted to slide in a backup bearing 37'. The backup bearing 37' is formed inside of an inverted stirrup type frame 38 with legs 39 thereof supported on a base 40. The legs 39 are spaced forwardly from the support 22 by frame 41. A shaft 42 is mounted in bearings 43 formed in the mid-portion of the legs 39.

Referring to FIGURES 11 and 12; the legs 38 are sufficiently spaced for mounting therebetween, the spaced gear segments 44 and 45, and bevel gears 46 and 47 on the shaft 42. An intermediate bevel gear 48 meshes with and spaces bevel gears 46 and 47. The intermediate bevel gear 48 is secured to the vertical shaft 49 rotatably mounted in bearing post 50. The bearing post 50 is supported on base 40.

The gear segments 44 and 45 are alike and are spaced to alternately engage and drive the toothed rack 35 in opposite directions for reciprocating the piston 21 in the respective forward and reverse cycles. Gear segment 44 and bevel gear 46 are secured to the shaft 42 by key 51; gear segment 45 is secured to bevel gear 47 and both gears turn together loosely on the shaft 42. The bevel gear 48 relatively reverses the rotation of gear segment 45 with gear segment 44.

The shaft 42 extends sufficiently outward from one bearing 43 for the mounting of an intermittent gear 52 secured thereto. The intermittent gear 52 is driven by a driving gear 53 meshed therewith. The driving gear 53 is adapted to turn the intermittent gear 52 preferably one sixth of a revolution at a time and rest briefly between fractional turns. The proportions of the intermittent gears may be varied in various models of my coffee brewer to accommodate the relative time of movements and rest to meet the desires of the trade as to the strength and relative proportion of measured coffee in the finished brew thereof.

The motor 54 with speed reduction transmission 55 is preferably supported on the base 40 and drives the driving gear 53 secured on shaft 56 of transmission 55.

The forward portion 57 of cylinder 20 illustrated in FIGURES 6, 7, 8, 9, 10 and 13, has substantially sufficient length for the forward end of the piston 21 to reciprocate to the forward end of the cylinder 20 as shown and withdraw within the cylinder a space equivalent to the return cycle of the transverse measure hole 24 from the flushing ports 30 to register with the dry coffee measure intake port 26 as illustrated in FIGURE 1.

A cover and cam actuator plate 58 is curved to fit over the major upper portion 57 of the cylinder 20. The cover plate 58 is secured by screws 74 to the forward portion 57 of the cylinder 20, and has a cam portion 59 projected into the cylinder a sufficient distance to guide one side of the cam pin 60 mounted in piston 21.

The cam portion 59 is shown in dash lines in FIGURES 6, 7 and 13, and illustrated in sectional views 8, 9 and 10 and is preferably integral with the cover plate 58.

The forward portion 57 of the cylinder 20 has a portion thereof removed to form the cam guide 61 as illustrated in FIGURES 6, 7, 8, 9, 10 and 13. The guide pin 60 is adapted to be guided in the slot 62 formed between the cam guide 61 and cam guide portion 59.

A T-shaped handle 63 is illustrated secured to the free end of the toothed rack 35 in FIGURES 6 and 11 and is adapted for manual operation for reciprocating the piston 21 in the cylinder 20 when desired.

FIGURE 15 illustrates a T shape handle 64 secured directly to the end of the piston 21 of cylinder 20 for a manual operation of reciprocating the piston 21 and the turning of the piston in the cylinder relative to the cylinder thereof.

The actuation of reciprocating the piston in the cylinder may be manual or automatic as described in this specification. The turning of the piston in the cylinder may be by manual or automatic means as described in this specification.

One form of automatic operation of my coffee brewer will be better understood from the diagrammatic view shown in FIGURE 16. One electrical conductor 65 is connected to one side of a push button switch 66, one side of the motor 54, one side of cut-off switch 67, and one side of the magnet of magnetically operated valve 68. The valve 68 is opened when the motor 54 is running and supplies hot water to the intake ports 27, 28 and 30. Another electrical conductor 69 is connected to the opposite side of the motor 54, the opposite side of the magnet of magnetically operated valve 68, and to one side of an electromotive source V. The opposite side of the electromotive source V is connected by electrical conductor 70 to the opposite side of the push button switch 66 and the opposite side of the cut-off switch 67.

It is obvious from the foregoing description and drawings that one form of automatic operation of my coffee brewer will be as follows:

Manually press push button switch 66 electrically energizing motor 54 and opening magnetically operated valve 68 causing hot water to flow to the hot water intake ports 27, 28, and 30. Motor 54 will actuate the forward movement of the piston 21 from the position ilustrated in FIGURE 1 by means of the intermittent gear 52, driving gear 53, and gear segment 44. The gear segment 44 starting from the position illustrated in dash lines of FIGURE 6 will engage the toothed rack 35 when retracted as shown in FIGURE 1 for forward movement of the piston 21. FIGURE 6 illustrates in solid lines the forward position of the piston 21, rack 35 and position of segmental gear, The transverse measure hole 24 is filled with dry ground or pulverized coffee from intake port 26 as positioned in FIGURE 1 and is moved forwardly to intake port 27 for a brief pause or rest by means of the actuated intermittent gears 52 and 53, gear segment 44, rack 35, and the piston 21 is guided in the cylinder by cam pin 60 traveling straight forward in the cam slot 62. The first rest or pause of the transverse measure hole 24 at intake port 27 admits hot water to the transverse measure hole 24 for penetrating the ground or pulverized coffee and extracting the brew. The brew is retained in measure hole 24. The next movement of measure hole 24 continues to ports 28 and 29 for a brief rest or pause when more hot water enters through intake port 28, passing through the saturated ground or pulverized coffee resting on the screen 25, and pouring the freshly brewed coffee with added water through the screen 25 to discharge port 29. Cam pin 60 is then moved forwardly with the piston 21 and turns the piston 21 within the cylinder 20 by means of the forward cam slot curvature in cam slot 62 to turn the transverse measure hole 24 horizontally with the screen turned toward the intake port 30. Then hot water will pour through intake port 30 to reverse flush the transverse measure hole 24 and flush the used coffee grounds through the discharge port 31.

Gear segment 44 will then disengage the toothed rack 35, and gear segment 45 turning in the opposite direction, reverses the toothed rack and piston for rearward return. Cam pin 60 is then moved straight rearwardly in cam slot 62 until it is cam actuated by the rear curvature of the cam slot 62 after the transverse measure hole 24 passes all of the hot water intake ports 30, 28 and 27 in closed relation thereto when it is then returned in an upright position registering with ground coffee intake port 26 which is the preferred stop and starting position.

The rear of piston 21 on the return finished position strikes the cut-off electrical switch 67 illustrated in FIGURE 16 and de-energizes both the motor 54 and magnetically operated valve 68 which shuts off the flow of hot water to the hot water intake ports 27, 28 and 30.

Detailed specific descriptions are made in this specification to assist one skilled in the art to understand the construction of the invention but are not restrictions to be applied to the scope of the claims appended.

What I claim, as new and desire to cover by the scope of the appended claims, is:

1. A machine for automatically brewing and dispensing one measure of coffee at a time; comprising: a bored cylinder, a piston, said piston being slidable in said cylinder, said piston having a transverse hole therethrough adapted to measure dry coffee, an intake port in said cylinder, a hopper mounted above said intake port in said cylinder and having a discharge port opening into the transverse hole in said piston when registering with said intake port, a screen secured in one end portion of the transverse hole of said piston and adapted to retain the grounds of brewed coffee, a second intake port on said cylinder spaced longitudinally from the dry coffee intake port being connected to receive hot water under pressure for brewing coffee, a third intake port with an opposed discharge port on said cylinder and spaced longitudinally from the second intake port being connected to a hot water inlet and discharging liquid coffee, a fourth intake port and a discharge port on said elongated cylinder spaced from said third intake port and being connected to receive hot water to reverse flush the measure hole in said piston in respect to the location of said screen being located close to the fourth intake port, a plurality of piston rings being spaced and recessed in said piston between said respective intake ports to prevent leakage therebetween a hot water pressure supply being connected to said second, third and fourth intake ports, actuating means intermittently sliding said piston to consecutively register the measure hole therein with said intake ports, actuating means returning said piston to register the measure hole therein with said intake port for dry coffee, and said piston having sufficient length to close the remaining intake port holes when the measure hole thereof registers with any one intake port.

2. A machine for automatically brewing and dispensing one measure of coffee at a time; comprising: a bored cylinder, a piston, said piston being slidable in said cylinder, said piston having a transverse hole therethrough adapted to measure dry coffee, an intake port in said cylinder, a hopper mounted above said intake port in said cylinder and having a discharge port opening into the transverse hole in said piston when registering with said intake port, a screen secured in one end portion of the transverse hole of said piston and adapted to retain the grounds of brewed coffee, a second intake port with an opposed discharge port on said cylinder and spaced longitudinally from the first intake port being connected to a hot water inlet and discharge port for liquid coffee, a third intake port and a discharge port on said bored cylinder spaced from said second intake port being connected to reverse flush the measure hole in said piston in respect to the location of said screen being located close to the third intake port, a plurality of piston rings being spaced and recessed in said piston between said respective intake ports to prevent leakage between the respective intake ports, a hot water pressure supply being connected to said second and third intake ports, actuating means intermittently sliding said piston to consecutively register the measure hole therein with said intake ports, actuating means returning said piston to register the measure hole therein with said intake port for dry coffee, and said piston having sufficient length to close the remaining intake port holes when the measure hole thereof registers with any one intake port.

3. A machine for automatically brewing and dispensing one measure of coffee at a time; comprising: an elongated cylinder, said cylinder being bored and hollow ground with a uniform diameter from end to end thereof, an elongated piston, said piston being closely fitted to slide in the bore of said cylinder, said piston being in said cylinder, said piston having a normally upright transverse hole therethrough adapted to measure dry coffee, an intake port in said cylinder, a hopper being mounted above said intake port in said cylinder and having a discharge port opening into the intake port of the transverse hole in said piston when registering therewith, a screen, said screen being secured in the normally lower end portion of the transverse hole of said piston, a second intake port on said cylinder spaced longitudinally from the dry coffee intake port adapted to receive hot water under pressure for brewing coffee, a third intake port and an opposed discharge port aligned on said cylinder and spaced longitudinally from the second intake port adapted for a hot water inlet and pouring coffee, a fourth intake port and a discharge port on opposed sides of said cylinder spaced longitudinally from said third intake port and adapted to reverse flush the measure hole in said elongated piston in respect to the location of said screen being close to the fourth intake port, a plurality of piston rings being spaced and recessed in said piston adapted to prevent leakage between said respective intake ports, a hot water pressure supply, said hot water pressure supply being connected to said second, third and fourth intake ports, actuating means, said actuating means adapted to intermittently slide said elongated piston measure hole to consecutively register with said intake ports, cam actuating means, said cam actuating means turning said piston to register the measure hole thereof with the fourth intake and discharge ports, said actuating means and said cam actuating means returning said piston to register the measure hole therein with said intake port for dry coffee, and said piston having sufficient length to close the remaining intake port holes when the measure hole thereof registers with any one intake port.

4. A machine for automatically brewing and dispensing one measure of coffee at a time; comprising: an elongated cylinder, said cylinder being bored and hollow ground with a uniform diameter from end to end thereof, an elongated piston, said piston being closely fitted to slide in the bore of said cylinder, said piston being in said cylinder, said piston having a normally upright transverse hole therethrough adapted to measure dry coffee, an intake port in said cylinder, a hopper being mounted above said intake port in said cylinder and having a discharge port opening into the transverse hole in said piston when registering with said intake port in said cylinder, a screen, said screen being secured in the normally lower end portion of the transverse hole of said piston, and adapted to retain the grounds of brewed coffee, a second intake port on said cylinder spaced longitudinally from the dry coffee intake port being connected to receive hot water under pressure for brewing coffee, a third intake port and a discharge port aligned on said cylinder and spaced longitudinally from the second intake port being connected to a hot water inlet and pouring coffee respectively, a fourth intake port and a discharge port on opposed sides of said cylinder spaced longitudinally from said third intake port and being connected to reverse flush the measure hole in said piston in respect to the location of said screen being close to the fourth intake port, a plurality of piston rings being spaced and recessed in said piston adapted to prevent leakage between said intake ports, a hot water pressure supply being connected to said second, third and fourth intake ports, actuating means, said actuating means adapted to intermittently slide said piston to consecutively register the measure hole therein with said intake ports, said actuating means adapted to return said piston to register the measure hole therein with said intake port for dry coffee, and said piston having sufficient length to close the remaining intake port holes when the measure hole thereof registers with any one intake port.

References Cited in the file of this patent

UNITED STATES PATENTS

| 2,237,851 | Swearingen | Apr. 8, 1941 |
| 2,670,101 | Heisterkamp | Feb. 23, 1954 |

FOREIGN PATENTS

| 500,568 | Italy | Nov. 19, 1954 |
| 515,285 | Italy | Feb. 14, 1955 |